United States Patent

Henderson

[15] 3,698,826
[45] Oct. 17, 1972

[54] AUTOMATIC ACTUATOR FOR A DRILLING MACHINE

[72] Inventor: Paul D. Henderson, Avon, Conn.

[73] Assignee: The Superior Electric Company, Bristol, Conn.

[22] Filed: May 10, 1971

[21] Appl. No.: 141,846

[52] U.S. Cl. .......................... 408/17, 408/130, 92/11
[51] Int. Cl. ............................................. B23b 47/22
[58] Field of Search ....... 408/130, 17; 92/8, 9, 11, 12

[56] References Cited

UNITED STATES PATENTS 3,463,036  8/1969  O'Connor .................. 92/11 X

Primary Examiner—Francis S. Husar
Attorney—Johnson & Kline

[57] ABSTRACT

An automatic drive for the quill of a drilling-milling machine that includes an air cylinder and a chain for extending and retracting the quill carrying the drill. Controls permit cycling the drill for normal drilling, deep hole (pecking) drilling and milling operations upon command either from manual or from stored information.

6 Claims, 7 Drawing Figures

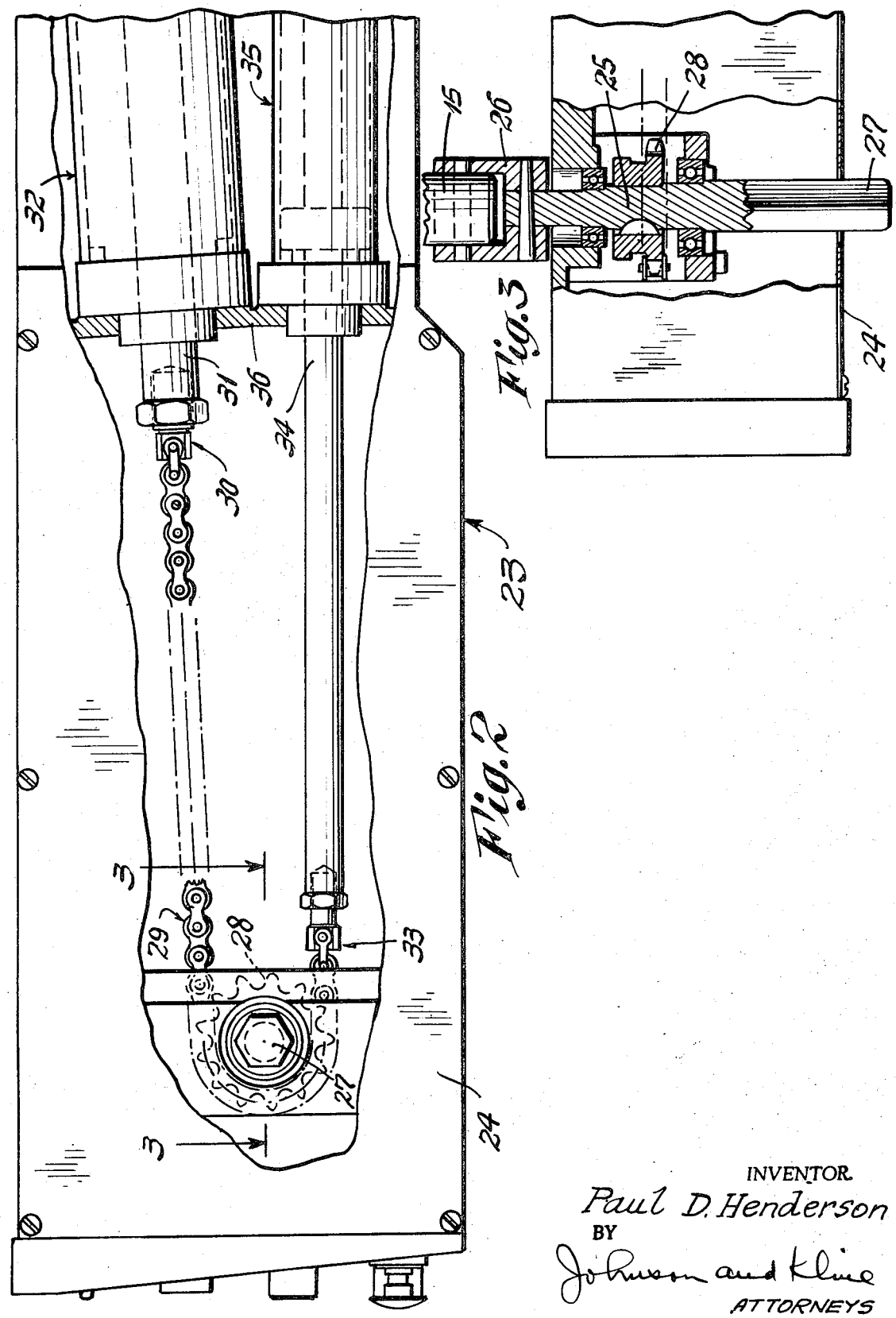

INVENTOR.
Paul D. Henderson
BY
Johnson and Kline
ATTORNEYS

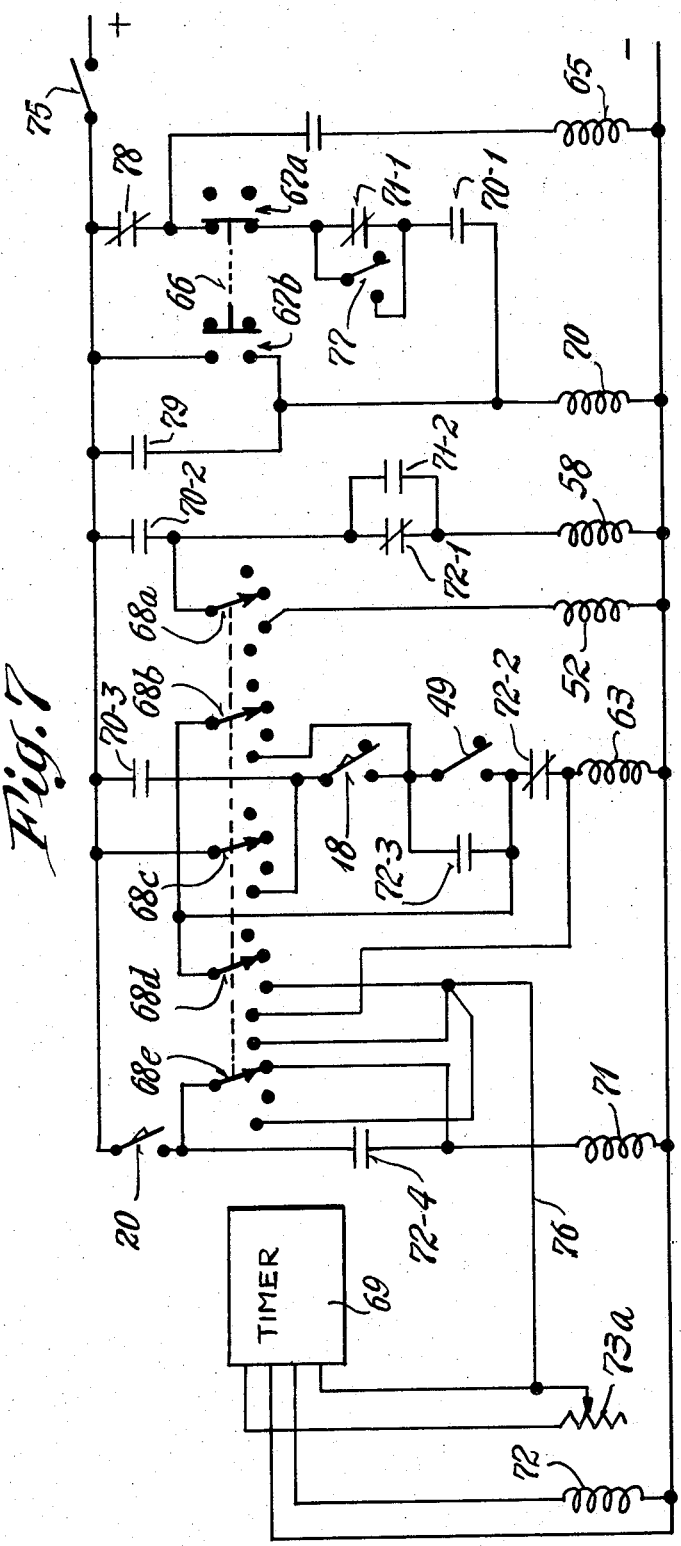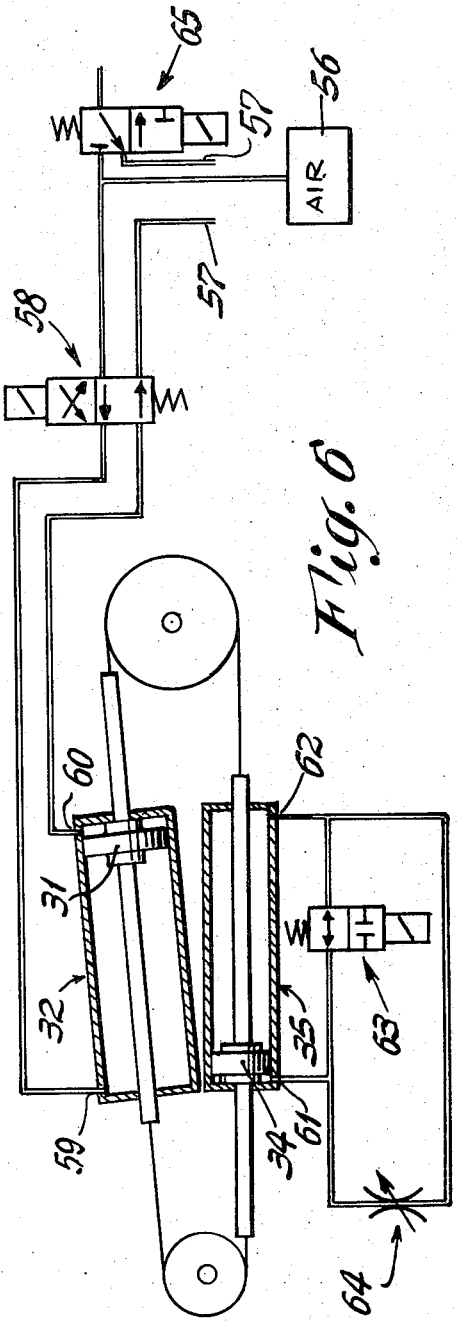

3,698,826

AUTOMATIC ACTUATOR FOR A DRILLING MACHINE

In operating machine tools according to coded instructions, a common operation involving a drilling-milling machine requires moving the tool into and out of the work after the work has been positioned with respect to the tool. The tool is rotated and supported for linear movement within a quill with the quill normally being actuated by turning a shaft as by a wheel or lever.

Though it has heretofore been proposed to actuate the quill automatically by substituting an actuator for the wheel or lever, such devices have not been found completely satisfactory. One or more deficiencies have resided in relatively complex units, operating parts not enclosed, overhanging parts, troublesome to accurately adjust and maintain adjustment, etc.

It is accordingly an object of the present invention to provide an actuator for a machine tool which is capable of automatically providing a plurality of operations including both normal and deep drilling operations.

Another object of the present invention is to achieve the above object with an actuator that is enclosed, easy to adjust, reliable and durable in use.

A further object of the present invention is to provide an actuator for the quill of a machine tool which substantially eliminates the heretofore mentioned deficiencies and which may be relatively economically manufactured.

The present invention is adapted to replace the usual quill moving manual handpiece on a machine tool which by effecting rotation of a quill shaft causes axial movement of the tool though it will be understood that it is usable on other devices requiring an automatic rotative movement. Specifically the actuator includes a front stub shaft connected directly to the quill shaft with the stub shaft carrying a chain sprocket. A rear stub shaft also contains a sprocket and is spaced in the actuator from the front stub shaft. Located between the two shafts is a double ended air cylinder and a double ended hydraulic cylinder with chain lengths attached thereto meshing with the sprockets on the stub shafts. Accordingly, the linear motion of the cylinder is applied to the quill shaft as a rotational movement for controlling tool movement.

In addition to enabling a compact, relatively economical and precise quill drive to be produced, the sprocket on the rear stub shaft is utilized to provide an accurate movement or position sensing of the tool for use in controlling certain operations such as deep hole drilling. It has a cam mounted therein which regulates the fast and slow travel of the tool and the cam is made to have a controlled slipping action with respect to the rear stub shaft such that it enables rapid movement of the tool when the tool is not engaging the work but slow controlled movement when the drill is performing the actual working operation.

Other features and advantages will hereinafter appear.

Referring to the drawing—

FIG. 1 is a diagrammatic representation of one form of a machine tool having the actuator of the present invention attached thereto.

FIGS. 2 and 2a constitute a side elevation of the actuator with portions removed to show interior details.

FIG. 3 is a section taken on line 3—3 of FIG. 2 showing details of the front stub shaft.

FIG. 6 is a schematic of the fluid circuit.

FIG. 7 is an electrical schematic diagram of the electrical components of the actuator.

Figure 1:
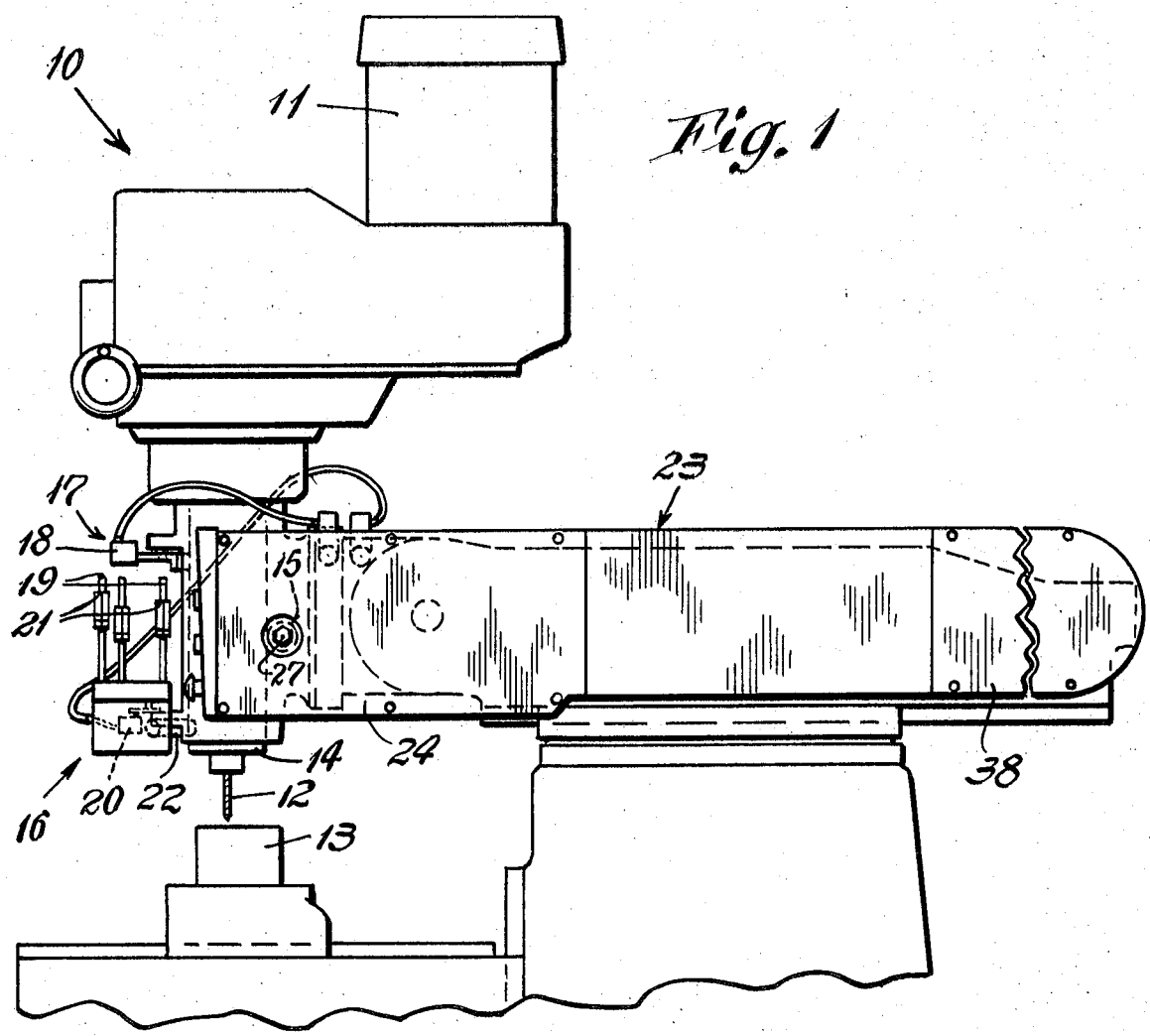

Referring to the drawings, there is shown in FIG. 1 a machine tool generally indicated by the reference numeral 10 having a motor 11 which rotates a tool such as drill 12 for effecting drilling operations in a workpiece 13. The drill is mounted for linear movement toward and from the workpiece by means of a quill 14 connected to a quill shaft 15 by a mechanical arrangement such as a rack and pinion (not shown) for effecting linear movement of the drill upon rotation of said quill shaft 15.

Mounted on the machine frame to be stationary is a depth stop turret generally indicated by the reference numeral 16 which cooperates with a sensing head 17 carried with the quill. The sensing head has a snap action feed switch 18 engageable with a selected feed rod such as rod 19 on the stop turret and actuatable to a closed position during such engagement. In addition, a snap action depth switch 20 is mounted in the turret 16 and is actuated upon the sensing head 17 engaging an adjustable abutment on the rod 19 such as abutment 21. The turret is indexable by means of an air cylinder 22 which may be automatically controlled to permit selection of the rod to be utilized. For a more specific description of the turret 16 and the sensing head 17 reference is made to my copending application Ser. No. 37,740 filed May 15, 1970 and now U.S. Pat. No. 3,626,791 and assigned to the assignee of the present invention.

The actuator of the present invention is generally indicated by the reference numeral 23 and includes a front housing 24 in which is mounted a front stub shaft 25. The shaft 25 includes an end 26 extending from the inner side of the housing that is fastened to the quill shaft 15 while its other end is hexagonically formed as at 27 to extend from the other side of the housing. Rotation of the shaft 25 accordingly rotates the quill shaft to effect movement of the drill.

For providing controlled rotation to the shaft 25, there is mounted thereon a chain sprocket 28 about which is wrapped a front chain 29. One end of the chain 29 is secured as at 30 to a piston 31 of a double ended air cylinder 32 while the other end of the chain 29 is secured as at 33 to a piston 34 of a double ended hydraulic cylinder 35. The front of the cylinders 32 and 35 are secured to a side 36 of the front housing.

The rear of cylinders 32 and 35 (FIG. 2a) are connected to a side wall 37 of a rear housing 38 which supports for rotation a rear stub shaft 39. A chain sprocket 40 is secured on the shaft 39 and is interconnected with a rear chain 41 which has one end connected as at 42 to the other end of the piston 31. The other end of the chain 41 is connected as at 43 to the other end of the piston 34 of the hydraulic cylinder 35.

It will be understood that with this construction movement of the piston 31 by introduction of air under pressure into the end of the cylinder 32 adjacent the wall 37 causes the piston 31 to move leftwardly rotating the stub shaft 25 counterclockwise to cause the quill shaft 15 to also rotate counterclockwise to effect downward movement of the quill. The actual force applied to the front chain is by the piston 34 being drawn rightwardly by the rear chain 41 as the piston 31 pulls the rear chain to rotate the sprocket 40. For movement of the quill upwardly, air is introduced into the end of the air cylinder 32 adjacent the side 36 which causes the piston 31 to move rightwardly to pull the front chain 29 to rotate the pulley 28 clockwise, pull the piston 34 leftwardly and cause the rear chain 41 to effect clockwise rotation of the rear stub shaft 39.

Figure 2A:
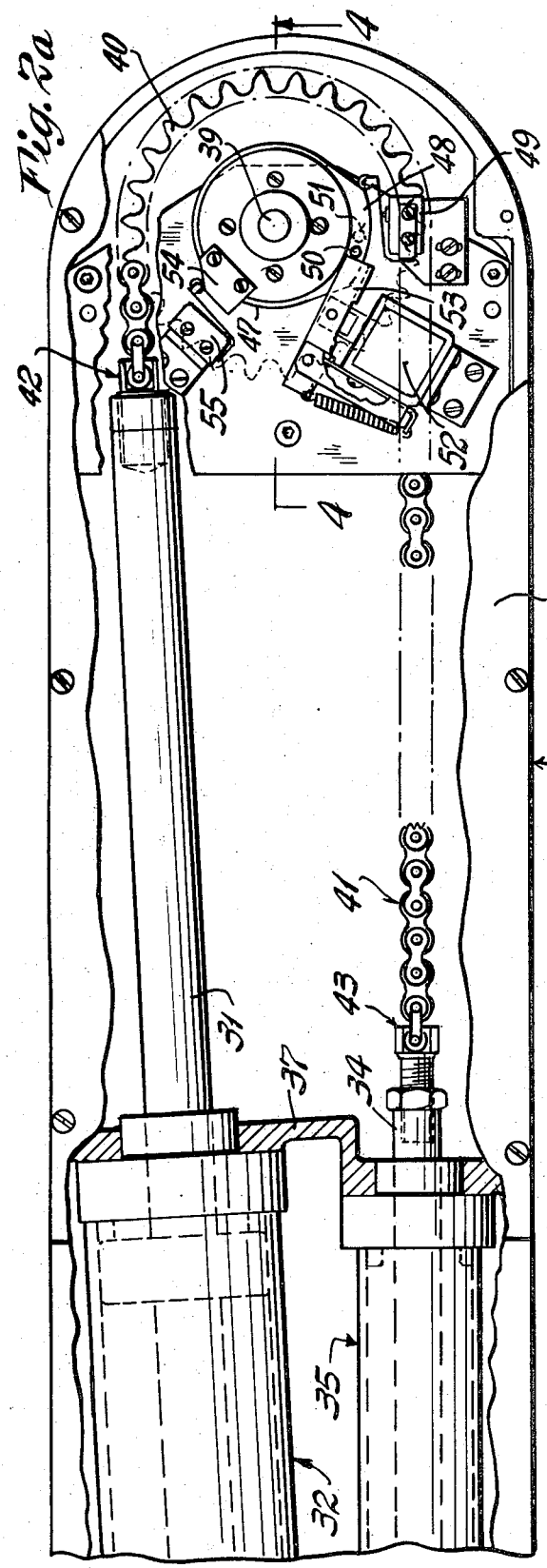
Figure 4:
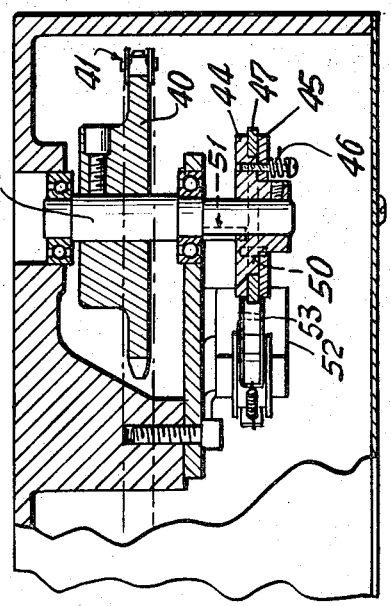
FIG. 4 is a view taken on line 4—4 FIG. 2a showing details of the rear stub shaft.

Referring to FIGS. 2a and 4, there is mounted on the rear stub shaft 39, a clutch assembly consisting of front and rear clutch plates 44 and 45 that are spring urged together as by springs 46 to frictionally engage therebetween an annular cam 47. The cam has an extended portion 48 which is engageable with a snap action peck switch 49 to actuate the same. Moreover, the cam additionally carries a pin 50 which is engageable with a roll pin 51 secured in the rear housing 38 such that rotation of the clutch plates 44 and 45 will normally carry the cam 47 therewith except when the pins 50 and 51 abut wherein the cam is then held stationary even with further counterclockwise rotation of the stub shaft 39.

Also secured to the rear housing 38 is a solenoid 52 which controls pivoting of a spring urged arm 53 such that in the deenergized position of the solenoid 52 the end of the arm 53 is engageable with the pin 50 to limit clockwise movement thereof. When the solenoid is energized, the arm 53 is pivoted to prevent possible engagement with the pin 50.

The front clutch plate 45 also carries a camming surface 54 which is engageable with a "home" switch 55 to provide an electrical signal when the quill has been raised to its uppermost position.

Referring to FIG. 6, there is shown diagrammatically the various components of the fluid circuit of the actuator of the present invention. These include the air cylinder 32 with its piston 31 and the hydraulic cylinder 35 with its piston 34. A source 56 of air under pressure and an exhaust 57 are connected through a four-way valve 58 to ends 59 and 60 of the air cylinder, it being understood that end 59 is adjacent the front housing side 36 while the end 60 is adjacent the rear housing side 37. In the unenergized position of the air valve 58, the source 56 is supplied to the end 59 to effect the retraction of the quill while in the air valve energized position, the source is connected to the end 60 for downward movement of the quill. The other end of the air cylinder in both instances is connected to the exhaust 57.

An end 61 of the hydraulic check cylinder 35 that is located adjacent the front housing side 36 is connected to the other end 62 thereof (adjacent the side 37) through a solenoid operated check valve 63 which in its unenergized position effects communication between the two ends but in its energized position blocks communication. With blockage, the fluid traveling from one end of the hydraulic cylinder 35 to the other is caused to pass through an adjustable feed rate valve 64 which is used to regulate the quantity of fluid which may flow therethrough.

Any movement of the piston 34 of the hydraulic cylinder 35 with the solenoid valve 63 being deenergized, exerts very little restraining force on the movement of the piston 31 in the air cylinder and accordingly the piston 31 may move rapidly to thereby cause a fast movement of the quill. Upon energization of the check valve 63, the speed of movement of the piston 31 is regulated by the adjustment of the feed rate valve 64 and thus enables regulation of the speed of movement of the drill into the workpiece 13.

There is also shown of the hydraulic diagram a solenoid valve 65 for controlling the indexing of the turret by the cylinder 22 upon energization of the valve 65.

Referring to the electrical schematic diagram, FIG. 7, the air cylinder valve 58, the check valve 63, the solenoid 52 and the turret solenoid valve 65 are indicated by their coil representations. In addition, the turret feed switch 18, the depth switch 20 and the peck switch 49 are shown. Further components of the circuit are a manual switch 66 having up contacts 67a and manual down contacts 67b, a five deck four position selection switch having decks 68a through 68e, a timer 69 having an adjustable lapse time with a maximum of approximately 20 seconds, a first relay having a coil 70 and contacts 70-1, 70-2, 70-3; a second relay having a coil 71 and contacts 71-1, 71-2 and a third relay having a coil 72 and contacts 72-1, 72-2, 72-3 and 72-4.

Figure 5:
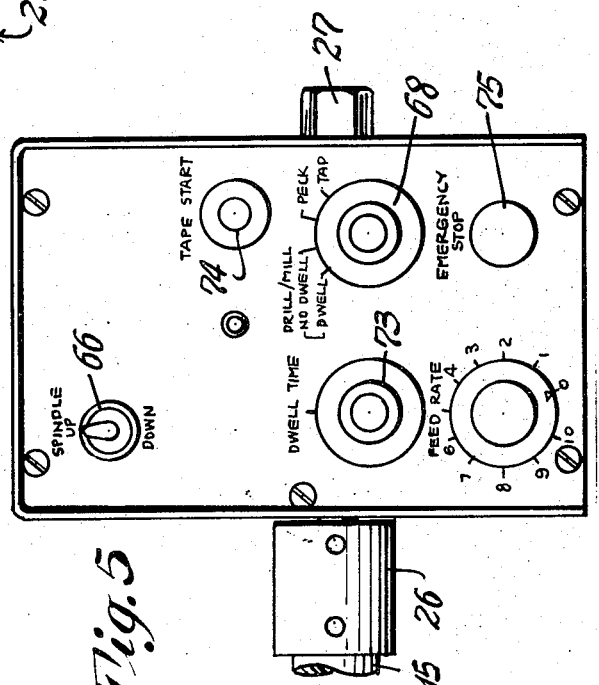
FIG. 5 is an elevation of the front of the actuator, showing certain control elements.

Referring to FIG. 5 the manual controls available to the operator are shown with the manual or spindle switch 66 being a two-position switch which in the up position effecting closure of up contacts 67a and in the down position effecting closure of down contacts 67b. The four-position five deck selection switch 68 is indicated having four positions identified as dwell; no dwell (for drilling and/or milling); peck and tap. A feed rate control is provided for adjusting the feed rate valve 64 and a dwell time control indicated by reference numeral 73 provides control over the extent of time of the timer 69 and effectively consists of the adjustable resistor shown in FIG. 7 and indicated by the reference numeral 73a. For effecting automatic control of the actuator by a numerical control system a tape start switch 74 is provided while an emergency stop switch 75 is also included and is indicated by this same reference number in the schematic diagram, FIG. 7.

In the operation of the unit to perform a normal drilling operation wherein the drill is merely extended downwardly into the work and then retracted, the turret feed rod 19, abutment 21 and feed rate valve 64 are initially set. The drill is in its up position and either the down contacts 67b are momentarily closed or a pair of contacts 79 are momentarily closed by a numerical control system to initiate drill movement. The relay 70 is thus energized and is maintained energized by a holding circuit formed by up contacts 67a, contacts 71-1 and 70-1. The air cylinder valve 58 is energized through a path formed by contacts 70-2 and 72-1 and effects downward movement of the quill at its fast rate in view of the solenoid 63 not being energized and the end 60 of the air cylinder 32 being connected to the air source 58. The quill will be moved at the fast rate until the feed switch 18 is actuated by the depth rod 19 which effects energization of the solenoid valve 63 through a path formed by contacts 70-3, feed switch 18, peck switch 49 and contacts 72-2 to cause the quill to move downward at the rate determined by the adjustment of the valve 64.

The quill will continue moving downward at the feed rate until the sensing head 17 engages the abutment 21 on the turret to effect closure of the depth switch 20. The switch 20 then energizes relay 71 through a path provided by the depth switch 20 and deck 68e as the switch 68 is in the no dwell position. The energization of relay 71 releases the holding circuit for the relay 70 by opening contacts 71-1 which in turn causes contacts 70-1, 70-2 and 70-3 to open to deenergize the air valve 58 and the check valve 63. Air is then introduced to the air cylinder 32 at the end 59 and retracts the quill at a fast rate.

If it is desired to have the drill, dwell or remain stationary at its depth position, then the deck switch 68 is placed in its dwell position which energizes, by a path through the depth switch 20 and a lead 76, the timer 69. The relay 72 is maintained deenergized for the duration for which the timer 69 is set and upon expiration of the time, the relay 72 becomes energized, closing contact 72-4 which then effects energization of relay 71 and deenergization of relay 70.

In the operation usually referred to as "pecking" where a deep hole is desired to be drilled in the work in a series of steps with the drill being withdrawn between steps in order to clear chips, etc., the switch 68 is set to its peck position. The quill is initially moved downwardly by energizing relay 70, either manually or by tape control, with its holding circuit maintaining it energized. The air cylinder valve 58 and the solenoid 52 are both energized, the former by contacts 70-2 and 72-1 and the latter by contacts 70-2 and deck 68a. The quill will move down at a rapid rate until the feed switch 18 is actuated to energize the check valve 63 through a path that includes contacts 70-3, feed switch 18, peck switch 49 and contacts 72-2 while the timer is energized by a path that includes contacts 70-3, feed switch 18, peck switch 49, deck 68d and lead 76. The quill will thus be moved downwardly at the selected feed rate for the length of time to which the timer 69 is set with the time setting and the feed rate determining the depth of the "peck." Upon expiration of the time the relay 72 becomes energized opening contacts 72-1 and 72-2 deenergizing the air cylinder valve 58 and the check valve 63 and effecting rapid retraction movement of the quill until the feed switch 18 becomes open. Relay 72 then becomes deenergized by a path that includes contacts 70-3, feed switch 18 and contacts 72-3 and effects energizing the air cylinder valve 58 through contacts 70-2 and 72-1.

Even though the feed switch 18 is now closed, the quill still moves down rapidly to the new slow feed position, which is just slightly above the previous position when the quill was retracted. The peck then becomes closed, the timer circuit is reenergized through a path consisting of contacts 70-3, feed switch 18, peck switch 49 and deck 68d of the switch 68. Simultaneously the check valve 63 is also energized which effects movement of the quill downwardly at the set feed rate until the timer 69 times out which effects fast withdrawal of the quill until the feed switch 18 becomes open. The quill is then again moved rapidly to just above its prior withdrawal position before proceeding at the feed rate. This pecking cycle is continually repeated until the depth switch 20 is actuated to energize relay 71 which opens contacts 71-1 and releases the holding circuit of relay 70 effecting retraction of the quill and deenergizing the solenoid 52.

It will be understood that the initial pecking stroke of the quill causes the peck switch to be actuated essentially as soon as the quill leaves its home position as determined by switch 55 and actuating plate 54. As the quill is moved downward at slow speed for the initial drilling stroke, the sprocket 40 revolves but the cam is prevented from moving counterclockwise therewith by engagement of the pins 50 and 51. In the withdrawal stroke, the cam moves with the sprocket 40 clockwise to assume a new position. The next downward stroke causes the cam to actuate the peck switch at its new position which is just prior to the down position of the quill where it was retracted and is basically the movement between the two pins 50 and 51 shown in FIG. 2a less the differential movement in the peck switch 49. The cam 47 is thus caused to assume a new position after each pecking stroke until the final depth is attained. On the retraction stroke from the final depth, the solenoid 52 by being deenergized, has its level 53 assume the position shown in FIG. 2a where it engages pin 50 and resets the cam 47 to its initial starting position.

In addition to the above operations of normal drilling and deep hole drilling the present invention of an actuator enables selection of an operation which may tap the workpiece, utilizing a tapping head on the quill. In this operation the tool switch may be automatically or manually operated while the switch 68 is set to the tap position. Accordingly, after energization of relay 70, as for example, by manual switch 67a the quill is moved downward as in the normal drilling operation. However, after the expiration of the time on the timer the quill is retracted at the same feed rate by the energization of relay 72 closing contacts 72-3 which energizes relay 71 to break the holding circuit of relay 70. The air cylinder valve 58 is deenergized causing quill retraction but the check valve 63 is maintained energized through a path provided by deck 68c, the feed switch 18, deck 68b and deck 68d. Thus the quill will retract at the same feed rate with which it was extended until the feed switch 18 is released which causes the check solenoid 63 to be deenergized, effecting rapid quill retraction.

If it is desired to control the quill as in a milling operation, the quill is extended as in the normal drilling operation until the depth switch 20 is actuated. The quill is maintained at this position by actuation of the relay 71 through the depth switch 20 and deck 68e (set at the no dwell position) until the relay 70 is deenergized by actuation of the switch 66 or by manual or automatic operation of a switch 78 at which time the quill will retract rapidly as in the normal drilling operation. A tool switch 77 is used to bypass contacts 71-1.

If it is desired to maintain the quill at the final depth position for a selected length of time during a milling operation, the timer 69 is energized by placing the switch 68 in its dwell position which through the deck 68e effects energization of relay 72 after expiration of the dwell time. Relay 71 then becomes energized through a path consisting of the depth switch 20 and contacts 72-4 to cause the quill to remain at this depth position until the holding circuit of relay 70 is open which may occur by manual momentary operation of the switch 66 or by manual or automatic operation of the switch 78 which may be a relay switch controlled by the numerical control system.

It will accordingly be appreciated that there has been disclosed, an actuator for providing rotational movement especially for a quill of a machine tool in order to automatically move a tool. Though the actuator includes an air cylinder for providing the movement, the actuator is rendered relatively compact, reliable and economical by the use of chains and chain sprockets connected to the cylinder for translating the linear movement of the cylinder into rotational movement.

Variations and modifications may be made within the scope of the claims and portions of the improvements may be used without others.

I claim:

1. An actuator for providing rotational movement especially for controlling the operation of a quill of a machine tool comprising a frame, a first shaft mounted on the frame and adapted to be interconnected to the quill and having a chain sprocket mounted thereon, a second shaft mounted on the frame and having a chain sprocket mounted thereon, a double ended air cylinder having a piston, a double ended hydraulic cylinder having a piston, a first chain interconnected between the two pistons and meshing with the first shaft sprocket, a second chain interconnected between the two pistons and meshing with the second shaft sprocket, means for controlling the admission of air under pressure to the ends of the air cylinder and means for regulating the speed of movement of the piston of the hydraulic cylinder to thereby control the rotational speed of the first shaft.

2. The invention as defined in claim 1 in which the two cylinders are mounted to be essentially parallel to each other and in which said cylinders are located between the two shafts.

3. The invention as defined in claim 2 in which each piston includes a piston rod extending from each end of their respective cylinders, in which the first chain is its ends connected to similar ends of the two piston rods and in which the second chain has its ends connected to the other ends of the two piston rods whereby said pistons move oppositely to each other.

4. The invention as defined in claim 1 in which means for controlling the speed of movement includes a cam frictionally mounted on the second shaft, an electrical switch actuated by a predetermined position of said cam, and means for shifting the relative position of the cam on the shaft during deep hole drilling operation.

5. The invention as defined in claim 4 in which the shifting means includes a pin secured on the cam and an abutment secured to the housing for limiting the cam movement with the second shaft for one rotational direction of movement of the second shaft.

6. The invention as defined in claim 5 in which there are means for providing a signal indicative of the end of the extent of movement of the quill, in which there are means for preventing movement of the cam with the second shaft in the other rotational direction and in which the signal, at least in some operations, causes the preventing movement means to be operative to thereby reset the cam on the shaft to a starting position.

* * * * *